United States Patent [19]

Bartmann et al.

[11] Patent Number: 4,659,803

[45] Date of Patent: Apr. 21, 1987

[54] PROCESS FOR PURIFYING POLYPHENYLENE OXIDES OBTAINED BY INTERRUPTION OF THE COPPER-AMINE CATALYZED POLYCONDENSATION OF ORTHO-DISUBSTITUTED PHENOLS

[75] Inventors: Martin Bartmann, Recklinghausen; Hanns-Jörg Bax; Klaus Burzin, both of Marl; Wilfried Ribbing, Dorsten; Srinivasan Sridhar, Marl, all of Fed. Rep. of Germany

[73] Assignee: Chemische Werke Huls Aktiengesellschaft, Marl, Fed. Rep. of Germany

[21] Appl. No.: 632,125

[22] Filed: Jul. 18, 1984

[30] Foreign Application Priority Data

Sep. 8, 1983 [DE] Fed. Rep. of Germany ....... 3332377

[51] Int. Cl.$^4$ .............................................. C08G 63/70
[52] U.S. Cl. .................................... 528/491; 528/492; 528/495; 528/499; 528/500
[58] Field of Search ............... 528/491, 452, 495, 499, 528/500

[56] References Cited

U.S. PATENT DOCUMENTS

| | | | |
|---|---|---|---|
| 3,783,147 | 1/1974 | Calicchia et al. | 528/499 |
| 3,838,102 | 9/1974 | Bennett et al. | 528/492 |
| 4,024,107 | 5/1977 | Bennett, Jr. et al. | 528/492 |
| 4,097,459 | 6/1978 | Bennett et al. | 528/492 |
| 4,263,426 | 4/1981 | Cooper et al. | 528/492 |
| 4,460,764 | 7/1984 | Reffert et al. | 528/499 |
| 4,463,164 | 7/1984 | Dalton et al. | 528/499 |

FOREIGN PATENT DOCUMENTS

| | | |
|---|---|---|
| 0098929 | 2/1986 | European Pat. Off. . |
| 2246552 | 4/1973 | Fed. Rep. of Germany . |
| 2364319 | 7/1974 | Fed. Rep. of Germany . |
| 2640147 | 3/1977 | Fed. Rep. of Germany . |
| 2755937 | 6/1978 | Fed. Rep. of Germany . |
| 51-12235 | 4/1976 | Japan . |

*Primary Examiner*—Lucille M. Phynes
*Attorney, Agent, or Firm*—Oblon, Fisher, Spivak, McClelland & Maier

[57] ABSTRACT

The invention relates to a process for purifying polyphenylene oxides obtained by interruption of the copper-amine catalyzed polycondensation of di-ortho-substituted phenols, where in said process the reaction mixture is subjected to a "reaction-extraction" (i.e., an extraction which is accompanied by reaction) with water or stream, at a temperature of 60° to 150° C. It is particularly advantageous if the starting mixture in the inventive process comprises a solution of the polyphenylene oxide wherein the reaction has been interrupted by water and $CO_2$, which solution is mixed into a toluene/water mixture; and further if the "reaction-extraction" is carried out in the presence of an alkanolamine and a stabilizer.

21 Claims, No Drawings

PROCESS FOR PURIFYING POLYPHENYLENE OXIDES OBTAINED BY INTERRUPTION OF THE COPPER-AMINE CATALYZED POLYCONDENSATION OF ORTHO-DISUBSTITUTED PHENOLS

BACKGROUND OF THE INVENTION

1. Field of the Invention

Polyphenylene oxides ("PPOs") and processes for their production are known. They are described, e.g., in Buehler, 1978, "Special Plastics", pub. Akademieverlag, Berlin (in German), and in U.S. Pat. Nos. 3,306,874 and 3,306,875.

2. Description of the Prior Art

Processes have been employed industrially (and have proven economically feasible) in which ortho-disubstituted phenols are oxidatively linked with the aid of copper-amine complexes, in the presence of oxygen or oxygen-containing gas mixtures. In these known processes, three process steps are necessary from the end of the reaction to the production of the end product in powder form. These are namely; the interruption of the polycondensation, the purification of the polymer, and the isolation of the PPO.

The polycondensation may be advantageously interrupted (depending on the reaction conditions) by either inactivating the catalyst or by separating out the catalyst or the polymer. However, in particular cases these measures, while they indeed interrupt the polycondensation, also result in incomplete purification of the polymer.

The most important interruption methods are the following: 1. Addition of aqueous acids; 2. Addition of alkalis; 3. Addition of complex-formers for copper ions; and 4. Addition of polar solvents for separating the polymer.

Probably the most frequently employed method of interrupting the polycondensation is the addition of aqueous acid solutions. However, the consumption of acid is substantial, and the degree of removal of the amine is unsatisfactory (see Ger. OS No. 22 46 552, p. 4, lines 1 to 8). Carrying out the operation in an extraction apparatus, e.g. countercurrent to a stream of aqueous acid, and possibly at elevated temperature (Ger. OS No. 21 05 372), represents a process advance, but also necessitates the use of large amounts of alkali metal hydroxides to recover the amines.

According to the process of the above-cited Ger. OS No. 22 46 522, the PPO reaction mixture containing the copper-amine catalyst and the polymer in an aromatic solvent is subjected to interruption by treatment with $CO_2$ in water, and then undergoes further processing. The amines are not separated from the polymer to a satisfactory degree, as seen in Example A, infra.

In Ger. Pat. No. 15 70 683, a process is described in which a 50% solution of sodium hydroxide is added to the PPO reaction mixture. It has not been possible to make this process commercially successful because the polymerization is not reliably interrupted (see Ger. Pat. No. 24 30 130).

With the aid of chelating agents, the catalyst is inactivated and the copper separated out (see Ger. Pat. No. 15 70 683, col. 15, lines 3 to 5; and Ger. OS No. 26 40 147). Additional experimental details may be obtained from Ger. OS No. 23 64 319. The critical disadvantage of all processes employing chelating agents is the reported decomposition of the polymer. It has been found (see Ger. OS No. 27 54 887) that the higher the temperature the more rapidly the polyphenylene oxide decompose; and the longer the interval between the end of the reaction and the isolation of the polymer the greater the degree of decomposition of the polyphenylene oxides. For example, the viscosity index (which is also an index of the average molecular weight of the polymer units) commonly decreases by more than 0.1 dl/g/hr at 50° C., and fairly often by 0.2 dl/g/hr or more (Ger. OS No. 27 54 887).

When special chelating agents are used, e.g. the polyamines of the process disclosed in Ger. OS No. 24 60 323, this decomposition remains unavoidable.

It has been proposed to add additional stabilizing agents such as bifunctional phenols (e.g. dihydroxybenzenes) and reducing agents (see Ger. OS No. 27 54 887) or aromatic amines (see Ger. OS No. 27 55 937) to the polymer solution in addition to the chelating agent. These solutions with the additional additives still cannot yield a satisfactory result, because fairly high concentrations of the additives are required, which in itself is a drawback and which further leads to additional difficulties in isolating the polyphenylene oxides.

So-called "antisolvents"—alcohols, ketones, or aqueous solutions of these—may be availed of, whereby the PPO polycondensation can be interrupted and the polymer separated out, while catalyst residues and diphenoquinone remain in the solvent. Nonetheless, small amounts of copper may remain in the polymer, which detrimetally effects the color of the polymer and catalyzes further decomposition (see Ger. OS No. 26 16 746).

A drawback common to all of the precipitation methods (e.g., Ger. Pat. Nos. 12 65 410 and 15 70 683, and Ger. OS Nos. 25 32 477, 25 32 478, 26 55 161, and 27 52 867) is the need to employ, process, and redistill large amounts of solvent (with accompanying losses). Therefore it is preferable in practice to recover the polymers by means of a so-called "direct isolation" process, e.g. steam stripping, spray drying, or hot water comminution. However, a precondition for the use of such processes is the prior removal of the residues of copper-amine catalyst and other impurities, to the extend quantitatively possible (see Ger. OS No. 24 60 323).

Finally, there are a number of known processes for improving the color characteristics of polyphenylene oxides, wherein reducing agents are employed. Thus, for example, Ger. Pat. No. 24 30 130 teaches the application of a dihydroxybenzene or a benzoquinone and a mild reducing agent. A drawback is the requirement for large amounts of dihydroxybenzenes, which are relatively un-biodegradable; and also the large amount of time required for separating the reaction mixture from the aqueous solution employed. Accordingly, thus far it has not been possible to develop these processes in economically feasible form.

SUMMARY OF THE INVENTION

It is accordingly an object of the present invention to devise an improved process for purifying polyphenylene oxides, whereby the troublesome impurity diphenoquinone can be removed.

It is a further object of the present invention to remove residual copper-amine catalyst to such an extent that the PPO solution obtained can be sent directly to a so-called "direct isolation" process.

In pursuing the first said object, the surprising discovery was made that the content of diphenoquinone can be substantially decreased if the interrupted reaction mixture is subjected to "reaction-extraction" i.e., an extraction which is accompanied by reaction with water or steam, at a temperature of 60° to 150° C. When such a process is carried out, no enrichment of the diphenoquinone is observed in the aqueous phase. The term "reaction-extraction" has been chosen because it is evident that the extraction is accompanied by a chemical reaction.

DESCRIPTION OF THE PREFERRED EMBODIMENTS

In a preferred embodiment of the inventive process the "reaction-extraction" is carried out in the presence of an alkanolamine. In this manner PPO solutions can be obtained which can be subjected to a "direct isolation" process.

There are various alternative ways of making use of the inventive process. For example, steam may be introduced into the reaction mixture, or alternatively hot water may be added to the reaction mixture. The pressure domain is not critical; e.g., the operation may be carried out at a slight overpressure or preferably at normal pressure.

It is crucial that the reaction mixture be maintained in contact with an aqueous phase which may contain up to 2% by wt. of an alkanolamine, preferably triethanolamine, at 60° to 150° C. The volumetric ratio of the organic phase to the aqueous phase is between 10:1 and 1:10, preferably between 5:1 and 1:1. According to a preferred procedure, the specified amount of water is added to the reaction mixture, and the resulting mixture is heated to 70°–90° C. in an extraction column and maintained at this temperature for 10 to 100 min. The two phases are then separated without difficulty.

In principle, the described inventive process may be employed to purify any copper-amine catalyzed polycondensation reaction mixture wherein the reaction has been interrupted by a known interruption method or one or more known methods. Such copper-amine catalysed polycondensations are well known in the art. The inventive process is particularly suitable for use with reaction mixtures wherein the reaction has been interrupted by the addition of aqueous acids or aqueous complexing agents. A particularly elegant variant among suitable reaction mixtures is as follows. One begins with a PPO reaction mixture wherein a di-ortho-substituted phenol which may be independently substituted by a $C_1$ to $C_4$ alkyl, preferably 2,6-dimethylphenol, is polymerized in the presence of a catalyst comprised of a copper (II) salt, morpholine, and possibly other activators, in a solvent comprised of a $C_6$ to $C_8$ aromatic hydrocarbon and a $C_1$ to $C_4$ aliphatic alcohol, preferably toluene and methanol respectively, in a volumetric ratio of between 92.5:7.5 and 50:50, under the condition that no polymer precipitate out.

Such a process is described, e.g., in Ger. Pat. App. No. P 33 13 864.8, "Process for Manufacturing Polyphenylene Oxides".

This reaction mixture is then treated with water and $CO_2$.

It was found, to great surprise, that by this technique it was possible to increase the degree of extraction of the amine from c. 80% (Ger. OS No. 22 46 552, p. 10, lines 8-10) to 98%. At the same time, the reaction solution obtained by this technique may be sent directly to a subsequent "reaction-extraction" step.

The aqueous phase as well, to which $CO_2$ is added in the interruption step, may contain up to 2 wt. % of an alkanolamine, preferably the same alkanolamine, which alkanolamine layer is employed advantageously in the "reaction-extraction", and which is namely an aliphatic compound with up to 12 C atoms and containing at least one hydroxyl group and one amine substructure, and is preferably triethanolamine.

When the polycondensation is interrupted by treating the reaction mixture with $CO_2$ and water, then during the "reaction-extraction" operation one observes a regression in the diphenoquinone content of the polymer solution, which regression is correlated with a regression in the molecular weight of the polymer. One skilled in the art would have expected (see *J. Polymer Sci., Polymer Chem. Ed.*, 19:1367 (1981)) that the quinones would react with the polymer at the increased temperature, and that accordingly the molecular weight would increase. Rather, it was found (in connection with the invention) that it is advantageous in these cases to carry out the "reaction-extraction" in the presence of a stabilizer.

Suitable stabilizers include:

1. Hypophosphorous acids and their salts;
2. Alkali and alkaline earth dithionites (i.e., salts of hyposulfurous acid $H_2S_2O_4$);
3. Aliphatic and aromatic $C_1$ to $C_{10}$ mercaptans, possibly with hydroxyl and/or amino group substituents; e.g., mercaptoethanol and thiophenol;
4. Hydrazine derivatives, or formula $H(R^1)N—NH(R^2)$, where $R^1$ and $R^2$ each are hydrogen, phenyl, or a $C_1$ to $C_6$ acyl group; and
5. 2,6-Di-t-butylphenols of formula:

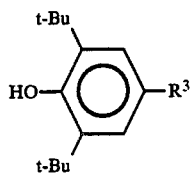

where $R^3$ is methyl, ethyl, or the group —$CH_2$—$C_2$—$COOR^4$, where $R^4$ is a hydroxyl-containing alkyl group with up to 8 C atoms which group may be esterified with additional carboxylates containing di-t-butylphenols (see Example 9, infra). The butylphenols (i.e., any additional such in said esters) are added beforehand.

The process set forth above and the stated combination of a mild yet effective interruption of the polymerization with a subsequent "reaction-extraction" is superior to prior art processes as follows:

1. The need to redistill relatively large amounts of polar solvents is obviated;
2. The processing of the amine carbonate is very simple;
3. There are no time-consuming phase separation problems; and
4. The polyphenylene oxide solutions obtained can be sent to a direct isolation process. The polymer, obtained from the solution by, e.g., spray drying, as a rule contains less than 10 ppm copper, 100 ppm diphenoquinone, and 100 ppm amine nitrogen. It is colorless and is stable under the processing conditions.

Obviously, the polyphenylene oxide solution obtained may alternatively be processed by the addition of a polar solvent, e.g. methanol. If this inherently more costly route is chosen, the diphenoquinone content may be reduced still further (see Example 2).

The polyphenylene oxide obtained according to the inventive process is usable either as such or as a copolymer in polymer formulations for the manufacture of particular heat-stable molded parts.

The invention will now be further illustrated by the following examples which are not intended to be limiting thereof.

EXAMPLE 1

3 g $CuCl_2.2H_2O$ and 7.5 g morpholinium bromide are dissolved in 30 g morpholine, and the solution is mixed with 1,300 g toluene and 207 g methanol in a 3 liter reactor equipped with an agitator. Then 30 g of a 50% solution of 2,6-dimethylphenol in toluene is added, and the polycondensation is initiated by introducing an air stream at 200 liter/hr, under stirring at 750 rpm. After 10 min, an additional 270 g of the dimethylphenol solution is added dropwise over 30 min. The temperature of the reaction mixture is held between 30° and 35° C. 60 min after the dimethylphenol addition is ended, the polycondensation is interrupted by the addition of 425 ml $H_2O$ and 2 g triethanolamine, and the introduction of $CO_2$ at 200 liter/hr until the exothermic reaction has essentially gone to completion. Then the phases are separated and the isolated organic phase is boiled 30 min with 425 ml water and 2 g triethanolamine, under reflux. After another phase separation, the polyphenylene oxide is isolated by spray drying.
  J (viscosity index; see infra, following Example C)=55 ml/g
  Color=white
  Copper content=<5 ppm
  Diphenoquinone content=<100 ppm

EXAMPLE 2

Procedure as in Example 1, except that the polymer is not spray dried but is precipitated out by the addition of 1,300 g methanol to the organic phase isolated after the "reaction-extraction"
  J (viscosity index)=57 ml/g
  Color=white
  Copper content=<5 ppm
  Diphenoquinone content=<20 ppm

EXAMPLE 3

Procedure as in Example 1, except that the "reaction-extraction" is carried out in a stirred autoclave at 120° C., wherein a pressure increase of 3 bar is observed.
  J (viscosity index)=52 ml/g
  Color=white
  Copper content=5 ppm
  Diphenoquinone content=100 ppm

EXAMPLE 4

Procedure as in Example 1, except that the interruption of the polycondensation is accomplished with $CO_2$ and $H_2O$ without the addition of triethanolamine.
  J (viscosity index)=55 ml/g
  Color=white
  Copper content=10 ppm
  Diphenoquinone content=100 ppm

EXAMPLE 5

Procedure as in Example 1, except that 2 g diethanolamine is used instead of the triethanolamine in the "reaction-extraction".
  J (viscosity index)=55 ml/g
  Color=white
  Copper content=7 ppm
  Diphenoquinone content=100 ppm

EXAMPLE 6

Procedure as in Example 1, except that the polycondensation is interrupted at only 45 min after the end of the dimethylphenol addition. The polymer solution is isolated, 3 g 2,6-di-t-butyl-p-cresol is added, and then the "reaction-extraction" is carried out as in Example 1. The polyphenylene oxide is then isolated by the addition of 1,300 g methanol.
  J (viscosity index)=55 ml/g
  Color=white
  Copper content=<5 ppm
  Diphenoquinone content=<100 ppm

EXAMPLE 7

Procedure as in Example 1, except that the polycondensation is interrupted at 45 min after the end of the 2,6-dimethylphenol addition, by addition of 200 g 50% acetic acid. Following phase separation, 3 g 2,6-di-t-butyl-p-cresol is added to the isolated polymer solution, and then the "reaction-extraction" is carried out as in Example 1. The polyphenylene oxide is then isolated by the addition of 1,300 g methanol.
  J (viscosity index)=55 ml/g
  Color=white
  Copper content=<5 ppm
  Diphenoquinone content=<100 ppm

EXAMPLE 8

Procedure as in Example 6, except that 3 g hypophosphorous acid is used instead of the di-t-butylcresol.
  J (viscosity index)=53 ml/g
  Color=white
  Copper content=<5 ppm
  Diphenoquinone content=<100 ppm

EXAMPLE 9

Procedure as in Example 6, except that 3 g of the ester formed from 4 equivalents of beta-(3,5-di-t-butyl-4-hydroxyphenyl)propanoic acid and pentaerythritol (IRGANOX ® 1010, from the firm Ciba-Geigy) is used instead of the di-t-butylcresol.
  J (viscosity index)=55 ml/g
  Color=white
  Copper content=<5 ppm
  Diphenoquinone content=<100 ppm

EXAMPLE 10

Procedure as in Example 6, except that 3 g (2,4-dichloro-5-methyl)thiophenol is added instead of the di-t-butylcresol.
  J (viscosity index)=52 ml/g
  Color=white
  Copper content=<5 ppm
  Diphenoquinone content=<100 ppm

EXAMPLE 11

Procedure as in Example 6, except that 3 g mercaptoethanol is used instead of the di-t-butylcresol.

J (viscosity index)=55 ml/g
Color=white
Copper content= <5 ppm
Diphenoquinone content= <100 ppm

COMPARISON EXAMPLE A

Procedure as in Example 1, except that the "reaction-extraction" is omitted.
J (viscosity index)=69 ml/g
Color=yellowish
Copper content=50 ppm
Diphenoquinone content=0.1%

COMPARISON EXAMPLE B

Procedure as in Example 1, except that the "reaction-extraction" is carried out at 30° C. The phases (PPO and toluene)/(H$_2$O and triethanolamine) can be separated only with the use of an augmented inertial field (namely, by centrifuging at 5,000 rpm).
J (viscosity index)=69 ml/g
Color=yellowish
Copper content=5 ppm
Diphenoquinone content=c. 0.1%

COMPARISON EXAMPLE C

Procedure as in Example 1, except that the "reaction-extraction" is carried out without the addition of the triethanolamine.
J (viscosity index)=55 ml/g
Color=white
Copper content=25 ppm
Diphenoquinone content=100 ppm

DEFINITION OF VISCOSITY INDEX J

The values of the quantity J given in the Examples were determined analogously to the German industrial standard DIN No. 53 728, i.e using the equation $$J = \left(\frac{\eta}{\eta_0} - 1\right)\frac{1}{c},$$

where $\eta$ is the dynamic viscosity of a 0.5% solution obtained by dissolving the reaction product in chloroform at 25° C.;
$\eta_0$ is the dynamic viscosity of chloroform at 25° C.; and
c is the concentration of the reaction product in the chloroform, in grams/ml.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for obtaining a purified polyphenylene oxide comprising:
   (i) catalyzing the polycondensation of at least one precursor monomer with a catalyst where said catalyst comprises a copper-amine species;
   (ii) interrupting said polycondensation with an aqueous acid; and
   (iii) treating said interrupted polycondensation with water or steam at a temperature of from 60° to 150° C.

2. The process of claim 1 wherein said monomer is a di-ortho-substituted phenol.
3. The process of claim 1 wherein said temperature is from 70° C. to 90° C.
4. The process of claim 1 wherein said treating step further comprises up to 2 wt. % of an alkanolamine in said water or steam.
5. The process of claim 4 wherein said alkanolamine comprises up to 12 carbon atoms.
6. The process of claim 5 wherein said alkanolamine is triethanolamine.
7. The process of claim 2 wherein said di-ortho-substituted phenol is independently substituted by a C$_1$ to C$_4$ alkyl.
8. The process of claim 7 wherein said di-ortho-substituted phenol is 2,6-dimethylphenol.
9. The process of claim 1 wherein the treating step is carried out in the presence of a stabilizer.
10. The process of claim 9 wherein said stabilizer comprises at least one member chosen from the group consisting of:
    (a) a hypophosphorus acid or salt thereof;
    (b) an alkali or alkaline earth dithionite;
    (c) an aliphatic or aromatic mercaptan containing up to 10 carbon atoms;
    (d) a hydrazine derivative of the formula:

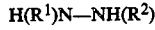

where R$^1$ and R$^2$ are each independently hydrogen, phenyl, or a C$_1$ to C$_6$ acyl group; and
    (e) a compound of the formula:

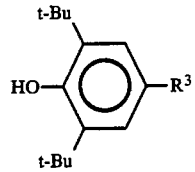

where R$^3$ is methyl, ethyl, or the group —CH$_2$CH$_2$—COOR$^4$,
    where R$^4$ is an alkyl group having up to 8 carbon atoms and at least one hydroxyl group.
11. The process of claim 10 wherein said mercaptan contains a hydroxyl group, an amino group, or a combination thereof.
12. The process of claim 11 wherein said mercaptan is mercaptoethanol or thiophenol.
13. The process of claim 10 wherein 2,6-di-t-butylphenol is used.
14. The process of claim 1 comprising:
    (a) catalyzing the polycondensation with morpholine as an amine component of the catalyst; wherein a polycondensation solvent comprising a C$_6$ to C$_8$ aromatic hydrocarbon and a C$_1$ to C$_4$ aliphatic alcohol is used and,
    (c) interrupting the polycondensation with carbon dioxide and water.
15. The process of claim 14 wherein said solvent comprises toluene and methanol in a volumetric ratio of about 92.5:7.5 to 50:50 respectively.
16. The process of claim 15 wherein said interrupting step further comprises up to 2 wt. % of an alkanolamine in said water.
17. The process of claim 16 wherein said alkanolamine is triethanolamine.

18. The process of claim 14 wherein said di-ortho-substituted phenol is 2,6-dimethylphenol.

19. A product obtained by the process of claim 1.

20. The process of claim 1, wherein the water added in the interrupting step is in a volumetric ratio of 10:1 to 1:10 with the organic phase.

21. The process of claim 20, wherein said ratio is 5:1 to 1:5.

* * * * *